United States Patent [19]
Hartigan et al.

[11] Patent Number: 5,704,094
[45] Date of Patent: Jan. 6, 1998

[54] ELECTRONIC DEVICE HAVING A CAM ASSEMBLY FUNCTIONING AS A DEPRESSIBLE HINGE

[75] Inventors: Michael J. Hartigan, Boca Raton, Fla.; Scott R. Wilcox, Chicago, Ill.

[73] Assignee: Motorola, Inc., Schaumburg, Ill.

[21] Appl. No.: 703,238

[22] Filed: Aug. 26, 1996

Related U.S. Application Data

[63] Continuation-in-part of Ser. No. 444,356, May 18, 1995, Pat. No. 5,628,089.

[51] Int. Cl.$^6$ .................... E05F 1/10; H04M 1/00
[52] U.S. Cl. .................... 16/303; 16/277; 379/433
[58] Field of Search .................... 16/229, 303, 307, 16/328–331, 284; 379/433

[56] References Cited

U.S. PATENT DOCUMENTS

| | | | |
|---|---|---|---|
| 165,619 | 7/1875 | Sanderson. | |
| 803,747 | 11/1905 | Elvin | 16/330 |
| 2,604,654 | 7/1952 | Anderson et al. | 16/303 |
| 3,063,089 | 11/1962 | Greenman | 16/303 |
| 3,401,422 | 9/1968 | Ventura. | |
| 3,518,716 | 7/1970 | Larson | 16/284 |
| 3,564,643 | 2/1971 | Salice. | |
| 3,772,736 | 11/1973 | Heittich et al.. | |
| 4,215,449 | 8/1980 | Loikitz | 16/303 |
| 4,822,965 | 4/1989 | Hyogo et al. | 16/330 |
| 4,897,873 | 1/1990 | Beutler et al. | 16/325 |
| 4,961,126 | 10/1990 | Suzuki | 16/330 |
| 5,040,268 | 8/1991 | Knurr | 16/261 |
| 5,109,571 | 5/1992 | Ohshima et al. | 16/330 |
| 5,138,743 | 8/1992 | Hoffman | 16/303 |
| 5,168,429 | 12/1992 | Hosoi | 16/229 |
| 5,185,790 | 2/1993 | Mischneki | 16/334 |
| 5,274,882 | 1/1994 | Persson | 16/303 |
| 5,303,291 | 4/1994 | Takagi et al. | 16/229 |
| 5,317,785 | 6/1994 | Kobayashi | 16/329 |
| 5,628,089 | 5/1997 | Wilcox | 16/303 |

FOREIGN PATENT DOCUMENTS

| 581410 | 8/1958 | Italy | 16/329 |
|---|---|---|---|

OTHER PUBLICATIONS

WO 93/18592 Pub. Date: 16 Sep. 1993; Inventor: Kudrna.

*Primary Examiner*—A. L. Pitts
*Assistant Examiner*—Donald M. Gurley
*Attorney, Agent, or Firm*—Eduardo Guntin; Daniel K. Nichols

[57] ABSTRACT

An electronic device (100) that has an housing assembly and electrical circuit therein includes a first housing portion (116), a second housing portion (118) coupled to the first housing portion (116), and a cam assembly (102) rotationally coupling the first and second housing portions (116, 118). The cam assembly (102) includes a cam (220), a cam follower (205), and a spring (224). The spring (224) resiliently biases the cam (220) and the cam follower (205) into engagement. At least one of the cam (220) and cam follower (205) is depressible within one of the first and second housing portions (116, 118) for permitting their assembly.

11 Claims, 3 Drawing Sheets

ELECTRONIC DEVICE HAVING A CAM ASSEMBLY FUNCTIONING AS A DEPRESSIBLE HINGE

PRIOR APPLICATION

This application is a continuation-in-part of U.S. application Ser. No. 08/444,356 filed May 18, 1995, now U.S. Pat. No. 5,628,089, by Wilcox et al., entitled "Radiotelephone Having a Self Contained Hinge."

FIELD OF THE INVENTION

This invention relates in general to the field of foldable electronic devices, and more specifically to an electronic device having a cam assembly.

BACKGROUND OF THE INVENTION

Two-way communication devices, such as pagers and portable cellular phones, are increasingly utilizing two foldable housing assemblies for compactness. The housing assemblies are usually referred to as a body and a cover or flip. In most instances, the body includes a keypad, and the bulk of electronics for receiving and transmitting messages from a remote transmission station. A small portion of electronics, such as a display and an antenna, are contained in the cover in cases where the electronic device is a pager. In the case of portable cellular phones, the display is usually located in the body.

Typically, prior art systems utilize hinge pins on the cover for manual or robotic assembly to the body. For example, some portable cellular phones utilize a hinge mechanism having a spring and two hinge pins disposed in a tubular hinge arm formed at an end of the cover, and bushings formed in the body. The spring is positioned between the hinge pins, and at all times urge outwardly the hinge pins from the cover to the body. Other prior art systems also utilize a cam assembly for providing an urging mechanism that positions the cover in open and closed positions relative to the body.

Such designs, although suitable for many commercial products, require a substantial number of manufacturing steps for assembly, and therefore are too costly for low cost consumer products such as pagers.

A need therefore exists for a low cost hinge assembly for joining a rotatably coupled cover and body.

SUMMARY OF THE INVENTION

An aspect of the present invention is a housing assembly comprising a first housing portion, a second housing portion coupled to the first housing portion, and a cam assembly rotationally coupling the first and second housing portions. The cam assembly comprises a cam, a cam follower, and a spring resiliently biasing the cam and the cam follower into engagement. At least one of the cam and cam follower is depressible within one of the first and second housing portions for permitting their assembly.

In a second aspect of the present invention, a housing assembly comprises a first housing portion, a second housing portion having a keyed portion coupled to the first housing portion, and a cam assembly coupled to the first and second housing portions. The cam assembly comprises a cam, a cam follower, a spring resiliently biasing the cam and the cam follower into engagement, and a cap. The cam, the cam follower and the spring are carried by the first housing portion and held in place with the cap. One of the cam and cam follower has a keyed portion for engaging the keyed portion included in the second housing portion. Moreover, one of the cam and cam follower is depressible within the first housing portion for permitting interlocking assembly of the first and second housing portions, and for rotational coupling at the first and second housing portions.

In a third aspect of the present invention, an electronic device comprises an electrical circuit, and a housing assembly including the electrical circuit. The housing assembly comprises a first housing portion, a second housing portion coupled to the first housing portion, and a cam assembly rotationally coupling the first and second housing portions. The cam assembly comprises a cam, a cam follower, and a spring resiliently biasing the cam and the cam follower into engagement. At least one of the cam and cam follower is depressible within one of the first and second housing portions for permitting their assembly.

DESCRIPTION OF THE PREFERRED EMBODIMENT

The disclosure of U.S. application Ser. No. 08/444,356, now U.S. Pat. No. 5,628,089, filed May 18, 1995 by Wilcox et al., entitled "Radiotelephone Having a Self Contained Hinge," is hereby incorporated by reference as fully set out herein.

Figure 1:
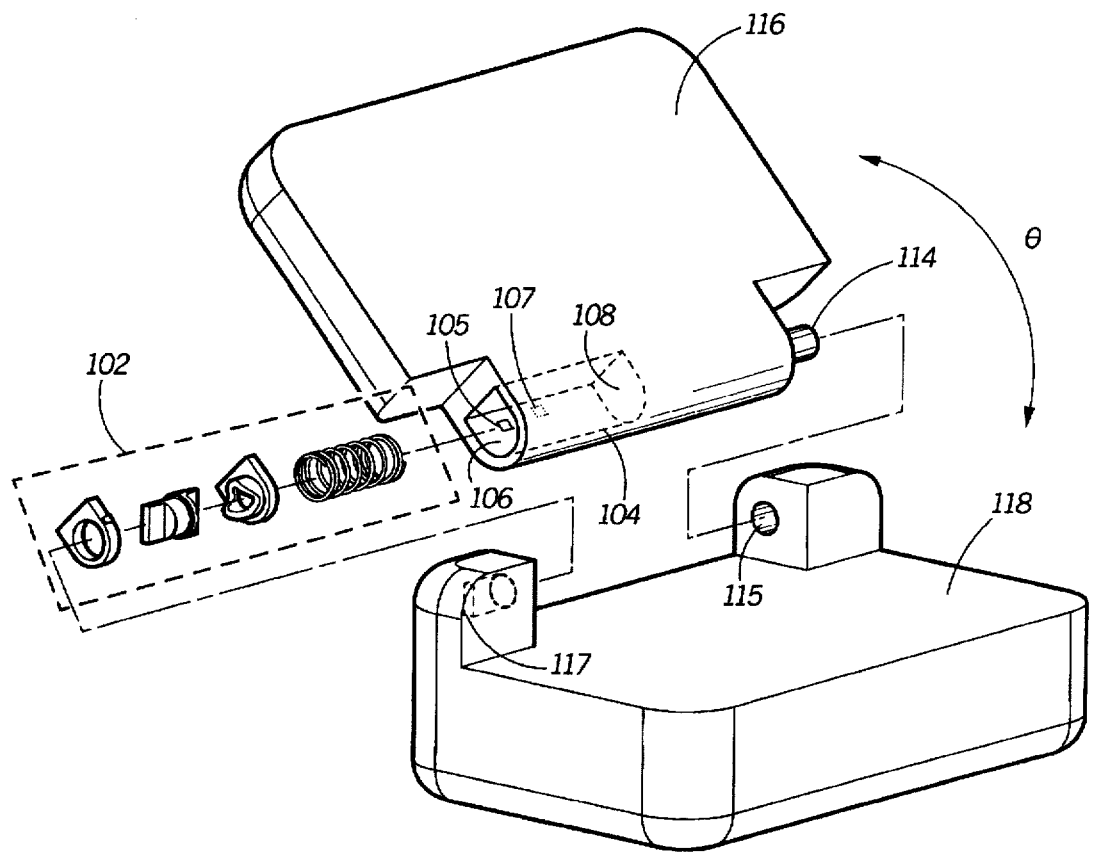
FIG. 1 is a perspective view of an electronic device shown with an exploded view of a cam assembly used as coupling elements of a housing assembly according to the present invention.

FIG. 1 is a perspective view of an electronic device 100 shown with a cam assembly 102 used as coupling elements of a housing assembly 102, 116, 118 according to the present invention. The housing assembly 102, 116, 118, which can include an electrical circuit 101 (not shown) for receiving messages from a remote transmission station (not shown), comprises a cover 116, a body 118 of the electronic device 100, and a cam assembly 102. The cover 116 and the body 118 constitute housing portions. The cam assembly 102 rotationally couples the cover 116, and body 118 about an axis of coupling and rotation.

The cover 116 and the body 118 are preferably manufactured using a plastic material, such as a polycarbonate plastic. It will be appreciated that, alternatively, other materials can be used as well. For purposes of clarity in FIG. 1, details of the interfaces of the electronic device 100 such as, for example, the display, user controls, and the like are not shown.

The cover 116 includes at one end a fixed hinge pin 114 that is preferably a integrally molded portion of the cover 116. The fixed hinge pin 114 is cylindrically shaped and is disposed in a cylindrically-shaped first cavity 115 of the body 118 having a diameter small enough to snuggly fit the fixed hinge pin 114, but large enough to allow rotational action within the body 118 with minimal friction. The cover 116 also includes a cavity 104 at its margin opposite to the fixed hinge pin 114, which receives the cam assembly 102 therein. Once the cam assembly 102 is disposed in the cavity 104, an end of a cam follower 205 (as is discussed below), which is part of the cam assembly 102, protrudes outside of the cover 116, and is positioned in a second cavity 117 of the body 118 which is keyed to fit the end of the cam follower 205 during final assembly of the cover 116 and the body 118.

The cavity 104 described above has a D-shaped opening 106 that extends throughout the cavity 104. The D-shaped opening 106 is keyed to the shape of some of the elements of the cam assembly 102 (as will be described below). The cavity 104 has a closed end 108 located at approximately a mid-portion of the cover 116. It will be appreciated that, alternatively, the cavity 104 can conform to other shapes, e.g., a rectangularly shaped opening, suitable for keying to other shapes of the elements of the cam assembly 102, and can be longer or shorter as required to house the cam assembly 102.

Figure 2:
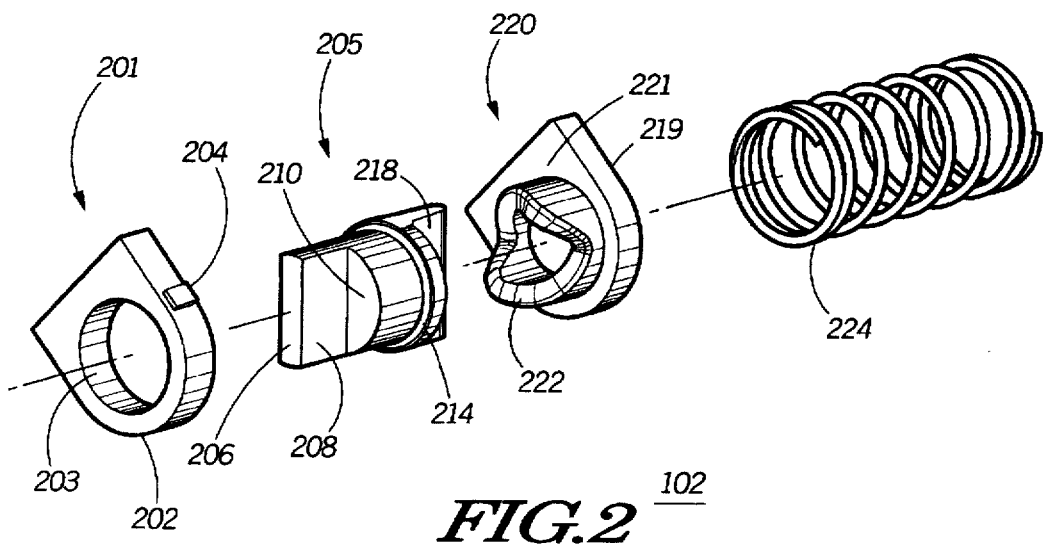
FIG. 2 is an exploded view of the cam assembly.

FIG. 2 is an exploded view of the cam assembly 102. The cam assembly 102, comprising cam assembly means, includes a cap 201, a cam 220 comprising cam means, the cam follower 205, mentioned above, comprising cam follower means, and a spring 224 comprising resiliently biasing means. During assembly the spring 224 is inserted in the cavity 104 first, followed by the cam 220, the cam follower 205, and the cap 201. The cam 220, the cam follower 205 and the spring 224 are carried by the cover 116 within the cavity 104 and held in place with the cap 201. The spring 224 resiliently biases the cam 220 and the cam follower 205 into engagement while assembled in the cover 116.

The spring 224 is preferably manufactured using a conventional metal, and is spiral shaped with an outer diameter less than the interior diameter of the cavity 104. In order to distribute the axial forces of the spring 224 on the closed end 108 of the cavity 104, and the cam 220 that is coupled thereto, a portion of the metal material is ground off the two ends of the spring 224 so that the spring 224 makes contact throughout the flat surface of the closed end 108 and the flat surface 219 of the cam 220. Since the spring 224 is cylindrically shaped, it can rotate and axially slide in the cavity 104. The inner diameter, length and spring constant of the spring 224 are selected to maintain suitable axial compressive forces on the cam 220 and the closed end 108.

The cam 220 is preferably manufactured from a conventional metal. The cam 220 comprises a D-shaped key 221 aligned to the D-shaped opening 106 of the cavity 104. The flat surface 219 of the cam 220 engages the spring 224, while the cam profile 222 is at its opposite side. The cam profile 222 is chosen to urge the cover 116 in one of two positions as is discussed below. It will be appreciated that, alternatively, other cam profiles can be used to urge the cover 116 in to one of three or more positions. The D-shaped key 221 allows the cam 220 to axially slide in the cavity 104 in response to compressive forces of the spring 224. The D-shaped key 221 also serves to rigidly affix the cam 220 to the cavity 104. As a result, the cam 220 rotates with the cover 116.

The cam follower 205 is preferably manufactured from a metal, such as brass, aluminum or carbon steel. The cam follower 205 includes, at one end facing the cam profile 222, a flat blade 218 perpendicular to a circular surface (not shown) having a diameter substantially equal to the diameter of the cam profile 222. After assembly, the flat blade 218 rests against the cam profile 222, which rotationally urges the flat blade 218 in a manner well known in the art. At an opposite end of the flat blade 218 is a keyed blade 208 perpendicular to a first circular surface 210 extending cylindrically to a second circular surface 214. The first circular surface 210 has a diameter less than the diameter of the second circular surface 214. As will be described shortly, the keyed blade 208 is rotatably affixed to the body 118 after assembly of the cover 116 and body 118.

After inserting the spring 224, the cam 220, and the cam follower 205 into the cavity 104 in the order shown, the cap 201, which is preferably manufactured from a plastic material, such as polycarbonate plastic, is used to hold these elements in place within the cover 116. The cap 201 includes a hole 203 with a diameter substantially similar to the diameter of the first circular surface 210 of the cam follower 205, but smaller than the diameter of the second circular surface 214. The diameter of the cap 201 allows the keyed blade 208 to pass through the hole 203, but restricts the cam follower 205 from further axial movement after the second circular surface 214 and the cap 201 make contact.

To interlock the cap 201 with the cavity 104, the cap 201 further includes two barbs 204 at diametrically opposing sides of the cap 201 (only one barb 204 is shown). The barbs 204 latch into diametrically opposing sub-cavities 105, 107 (shown in FIGS. 1 and 3) formed in the interior surfaces of the cavity 104, thereby axially locking the cap 201 to the cavity 104. The cap 201 also has a D-shaped structure that conforms to the D-shaped opening 106 of the cavity 104. The barbs 204 along with the D-shaped structure of the cap 201 rigidly aligns the cap 201 to the cavity 104. Consequently, the cap 201 rotates with the cover 116.

Figure 3:
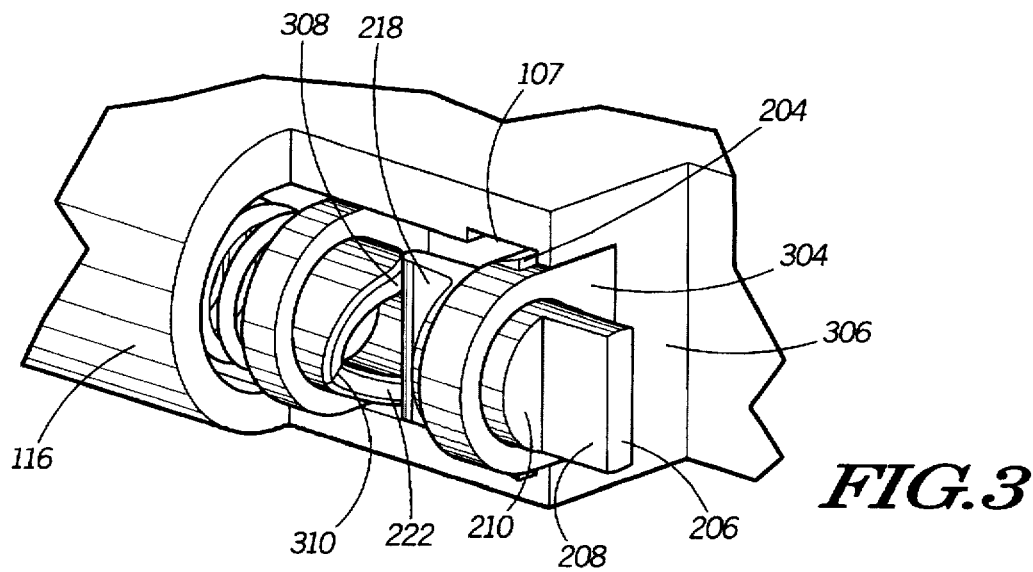
FIG. 3 is a fragmentary perspective cross-sectional view of the cam assembly configured according to the present invention.

FIG. 3 is cross-sectional view of the cam assembly 102 after it has been assembled into the cover 116 according to the present invention. As shown, the barbs 204 and the sub-cavities 105, 107 are preferably positioned such that the front face 304 of the cap 201 is flush with the a side surface 306 of the cover 116. The spring 224 in combination with the cam 220 and the cam follower 205 maintain suitable forces on the barbs 204 of the cap 201, thereby further locking the cap 201 in place. It should also be noted in FIG. 3 that the flat blade 218 of the cam follower 205 is positioned at the highest point 308 of the cam profile 222, corresponding to the closed position of the cover 116. This is one possible position of the cam follower 205 after assembly. However, this position is for illustration purposes and is not the preferable position for assembly. The preferable position is where the flat blade 218 rests on the lowest position 310 of the cam profile 222, corresponding to the open position of the cover 116. In this position the cover 116 is assembled with the body 118 in the open position.

Figure 4:
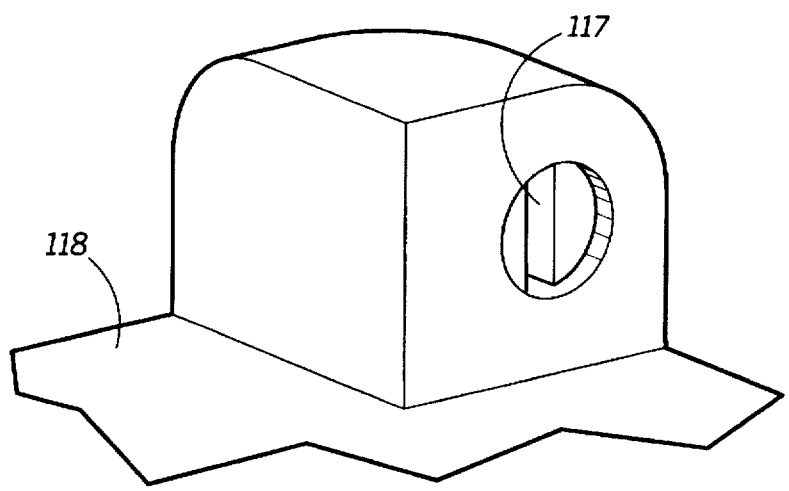
FIG. 4 is fragmentary perspective view of a keyed portion of a body of the electronic device according to the present invention.

FIG. 4 is a perspective view of the second cavity 117 included in the body 118 for attachment to the keyed blade 208 of the cam follower 205. As shown, the second cavity 117 conforms to the shape of the keyed blade 208 providing a snug fit after insertion. Once the keyed blade 208 is positioned in the second cavity 117, the cam follower 205 is rigidly affixed to the body 118. Consequently, when the cover 116 is rotated about the pivot point between the body 118 and the cover 116, the cam follower 205 remains stationary, and the cam profile 222 slides along the flat blade 218 of the cam follower 205. This action forces the cam 220 slidably in and out of the cavity 104 according to the position of the flat blade 218 and the cam profile 222, which rotates with the cover 116. The forces exerted between the cam follower 205 and the cam 220 create rotational forces that urge the cover 116 into open and closed positions.

It will be appreciated that, alternatively, that the keyed blade 208 of the cam follower 205 can use other shapes, such as two blades crossed perpendicular to each other's midsection. It will be further appreciated that the second cavity 117 can be modified to accommodate these alternate shapes.

Figure 5:
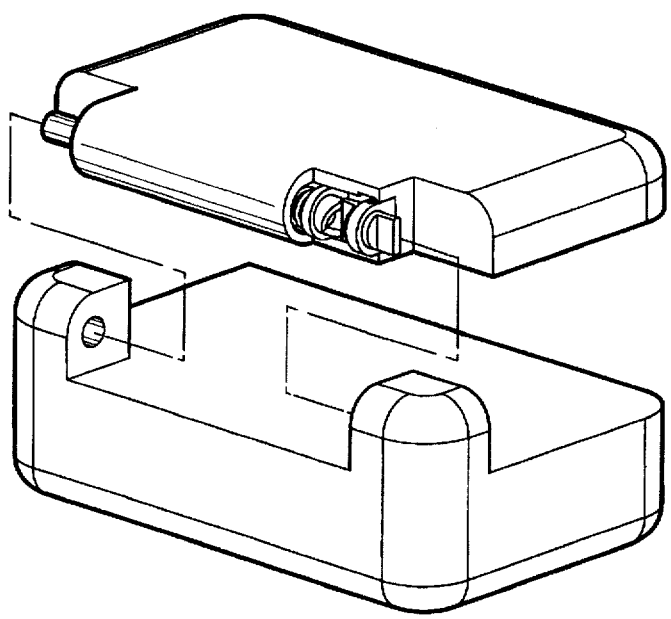
FIG. 5 is a perspective view of the assembly of the first and second housing portions according to the present invention.

FIG. 5 is a perspective view of the assembly of the cover 116 and the body 118 according to the present invention. Prior to assembly of the cover 116 and the body 118, the cam assembly 102 is disposed into the cover 116 as described above. Thereafter, the cover 116 is positioned to insert the fixed hinge pin 114 into the cylindrically-shaped first cavity 115. Once inserted, the front face 206 of the keyed blade 208 is depressed with a blunt instrument until it is approximately flush with the front face 304 of the cap 201. The spring constant of the spring 224 is chosen to exert a compression force (e.g., 5 lb) that can be reasonably depressed by a human operator or automated equipment during assembly. In addition, the length of the spring 224 is chosen to allow the cam follower 205 and the cam 220 to be slidably displaced enough to make the front face 206 of the keyed blade 208 flush with the front face 304 of the cap 201.

Returning to the final assembly steps, the keyed blade 208 is maintained depressed until the keyed blade 208 is positioned for engagement with the second cavity 117 of the body 118. As noted above, the cover 116 will have to be positioned in either the closed or open position depending on the orientation of keyed blade 208 after the cam assembly 102 has been assembled into the cover 116. Once the cover 116 is in position, the blunt instrument is removed thereby engaging the keyed blade 208 with the second cavity 117.

After completing the assembly of the cover 116 and the body 118, the elements of the cam assembly 102 act as an urging mechanism for urging the cover 116 into or out of open and closed positions. FIG. 1 shows the cover 116 in the open position at an obtuse angle (e.g., θ=150°). The urging mechanism generates an axial force and translates the axial force into a rotational force to urge the cover 116 to remain in open and closed positions and, further, urges the cover 116 into or out of open and closed positions during rotation of the cover 116.

It will be appreciated that, alternatively, the embodiment above can be modified to swap the assembly positions of the cam 220 and cam follower 205. Similarly, it will be appreciated that, alternatively, the cavity 104 can be located in the body 118 for carrying the cam assembly 102 instead of the cover 116. Depending on design requirements, either housing portion could carry the cam assembly 102. Hence in any combination of these embodiments, at least one of the cam 220 and cam follower 205 is depressible within one of the cover 116 and the body 118 for permitting their assembly.

Figure 6:
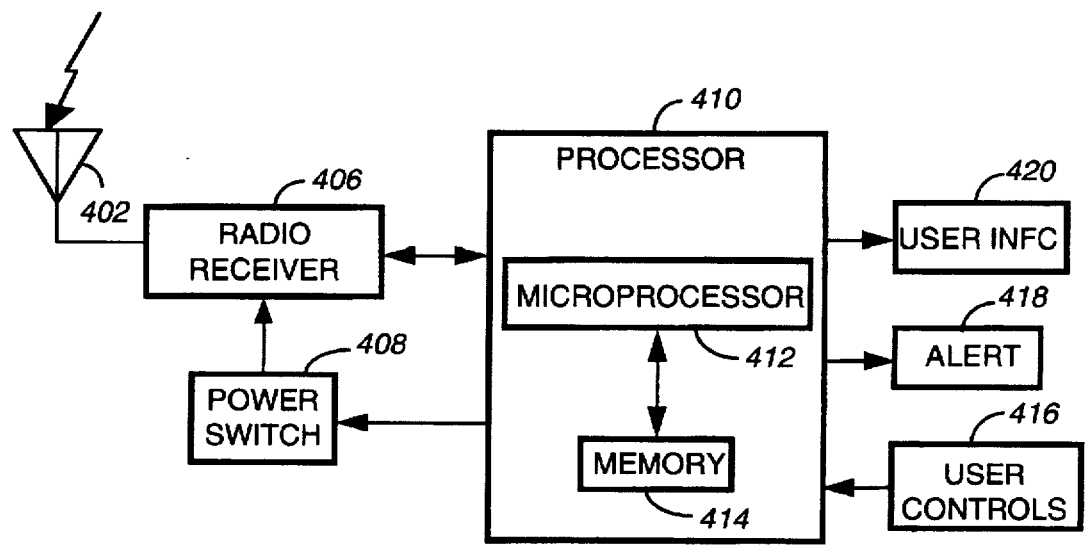
FIG. 6 is an electrical block diagram of an electrical circuit of the electronic device.

FIG. 6 is an electrical block diagram of the electrical circuit 101 of the electronic device 100. The electrical circuit 101 performs, by way of example, the function of a selective call receiver for receiving selective call messages from a radio communication system. The electrical circuit 101 comprises a radio receiver 406, an antenna 402, a processor 410, a power switch 408, an alerting device 418, user controls 416, and a user interface 420.

The radio receiver 406 is a conventional radio receiver coupled to the antenna 402 for receiving radio signals (e.g., FM signals) from the radio communication system and for generating a demodulated signal. The processor 410, coupled to the radio receiver 406, is used for controlling operation of the electronic device 100, and for processing a message included in the demodulated signal. The power switch 408 is a conventional MOS switch coupled to the processor 410 for controlling power supplied to the radio receiver 406, thereby providing a battery saving function.

To perform the necessary functions of a selective call receiver, the processor 410 includes a microprocessor 412, and a memory 414. The microprocessor 412 is, for example, a M68HC08 micro-controller manufactured by Motorola, Inc. of Schaumburg Ill. The memory 414 preferably includes a conventional read-only memory (ROM) and a conventional random-access memory (RAM).

The microprocessor 412 is programmed by way of the memory 414 for processing selective call messages transmitted by the radio communication system. Upon receiving a selective call message, the microprocessor 412 samples the demodulated message generated by the radio receiver 406. The microprocessor 412 then decodes an address in the demodulated message, compares the decoded address with one or more addresses stored in the memory 414, and when a match is detected, proceeds to process the remaining portion of the message.

Once the microprocessor 412 has processed the message, it stores the message in the memory 414, and a call alerting signal is generated to alert a user that a message has been received. The call alerting signal is directed to the conventional audible or tactile alerting device 418 for generating an audible or tactile call alerting signal. By the use of appropriate functions provided by the user controls 416, the received message is recovered from the memory 414, and displayed on a user interface 420. The user interface 420 is, for example, a conventional liquid crystal display (LCD). Alternatively, when the message is a voice message, the message is played out on a conventional audio circuit (not shown in FIG. 6) included in the selective call receiver.

The body 118 preferably includes all the elements of the electrical circuit 101 excluding the antenna 402 and the user interface 420. The antenna 402 and the user interface 420 are preferably included in the cover 116. The user interface 420 and the antenna 402 preferably are electrically coupled to the processor 410 and the radio receiver 406, respectively, by a flexible printed circuit board extending between midsections of the cover 116 and the body 118 (not shown).

In summary, the present invention provides an apparatus for rotatably coupling a cover 116 and body 118 by way of a cam assembly 102 that functions as a depressible hinge pin. The cam assembly 102 performs a dual function of facilitating assembly during the manufacturing process by way of the depressible hinge pin, and after assembly, functionally operating to urge the cover 116 into designated open and closed positions with respect to the body 118. Moreover, the present invention requires a minimal number of parts, thereby simplifying the manufacturing process, and reducing cost. Furthermore, the present invention can be applied to various electronic devices such as cellular phones, pagers, pocket organizers, and other devices that utilize rotatable covers.

As a final note, the detailed description provided above should be viewed as exemplary, and not restrictive of the invention as claimed below.

What is claimed is:

1. A housing assembly, comprising:

a first housing portion having a cavity;

a second housing portion coupled to the first housing portion; and a cam assembly contained by the cavity of the first housing portion, the cam assembly rotationally coupling the first and second housing portions, the cam assembly consisting of:

a cam, a cam follower, and a spring resiliently biasing the cam and the cam follower into engagement, wherein at least one of the cam and cam follower is depressible within the cavity of the first housing portion for permitting assembly with the second housing portion, wherein one of the cam and cam follower has a keyed portion, and wherein one of the cam and cam follower is keyed to the cavity.

2. The housing assembly as set forth in claim 1, wherein the second housing portion includes a keyed portion that engages to the keyed portion of one of the cam and cam follower.

3. The housing assembly as set forth in claim 1, wherein one of the first and second housing portions comprises a cover and the other housing portion comprises a body.

4. A housing assembly, comprising:

a first housing portion having a cavity;

a second housing portion rotationally coupled to the first housing portion; and cam assembly means contained by the cavity of the first housing portion, the cam assembly means coupled to the first and second housing portions, the cam assembly means consisting of:

cam means, cam follower means, and resiliently biasing means for biasing the cam means and the cam follower means into engagement, wherein at least one of the cam means and cam follower means is depressible within the cavity of the first housing portion for permitting assembly with the second housing portion, and wherein one of the cam means and cam follower means is keyed to the cavity.

5. A housing assembly, comprising:

a first housing portion having a cavity;

a second housing portion having a keyed portion coupled to the first housing portion; and a cam assembly contained by the cavity of the first housing portion, the cam assembly coupled to the first and second housing portions, the cam assembly consisting of:

a cam, a cam follower, a spring resiliently biasing the cam and the cam follower into engagement, and a cap holding, the cam, the cam follower and the spring in place on the first housing portion, one of the cam and cam follower has a keyed portion for engaging the keyed portion included in the second housing portion, wherein one of the cam and cam follower is keyed to the cavity, and at least one of the cam and cam follower is depressible within the cavity of the first housing portion for permitting interlocking assembly of the first and second housing portions, and for rotational coupling at the first and second housing portions.

6. An electronic device, comprising:

an electrical circuit; and a housing assembly including the electrical circuit, comprising:

a first housing portion having a cavity, a second housing portion coupled to the first housing portion, and a cam assembly contained by the cavity of the first housing portion, the cam assembly rotationally coupling the first and second housing portions, the cam assembly consisting of:

a cam, a cam follower, and a spring resiliently biasing the cam and the cam follower into engagement, wherein at least one of the cam and cam follower is depressible within the cavity of the first housing portion for permitting assembly with the second housing portion, wherein one of the cam and cam follower has a keyed portion, and wherein one of the cam and cam follower is keyed to the cavity.

7. The electronic device as set forth in claim 6, wherein the electrical circuit is a selective call receiver for receiving selective call messages from a radio communication system.

8. The electronic device as set forth in claim 6, the electrical circuit comprising in the second housing portion:

a radio receiver for receiving radio signals from a radio communication system and for generating a demodulated signal;

a processor coupled to the radio receiver for controlling operation of the electronic device, and for processing a message included in the demodulated signal;

an alerting device coupled to the processor for alerting a user of the message received by the electronic device; and user controls coupled to the processor for enabling control of the electronic device by the user.

9. The electronic device as set forth in claim 8, the electrical circuit comprising in the first housing portion:

an antenna coupled to the radio receiver; and a user interface for conveying messages to the user.

10. The electronic device as set forth in claim 6, wherein one of the first and second housing portions is a cover; and the other housing portion is a body coupled to the cover, wherein the body and the cover are rotatable about an axis of coupling and rotation.

11. The electronic device as set forth in claim 6, wherein the second housing portion includes a keyed portion that engages to the keyed portion of one of the cam and cam follower.

* * * * *